J. K. PARK.
AMERICAN BASKET COMPANY ASSIGNEES.
Fruit-Baskets.
No. 5,579. Reissued September 23, 1873.
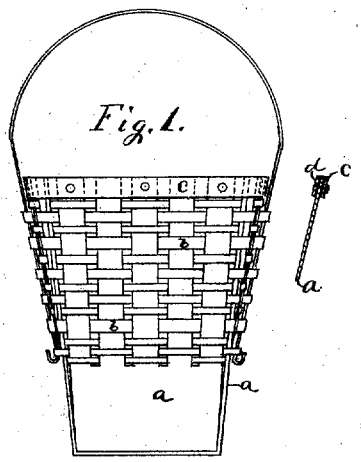
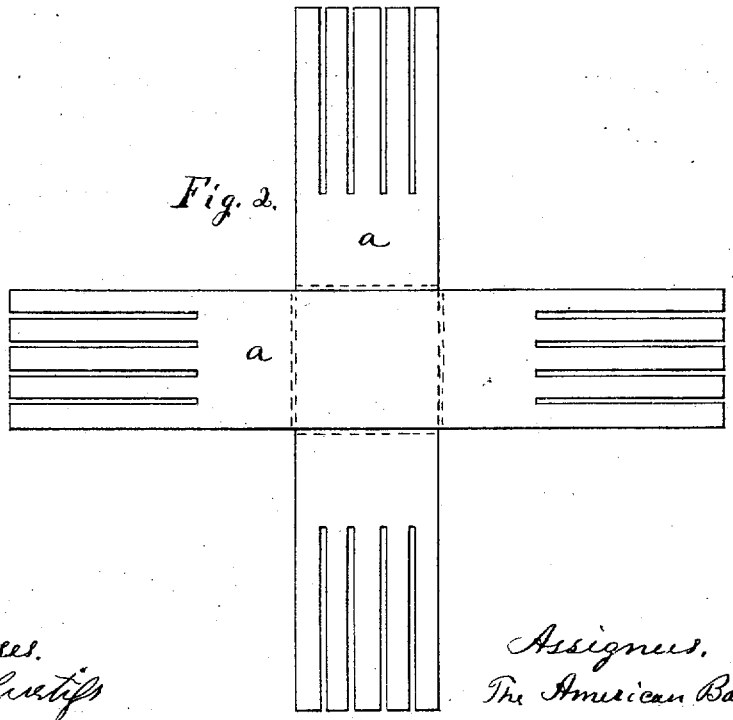
Witnesses.
Wm. G. Curtiss
C. A. Shepard.
Assignees.
The American Basket Co.
By James Shepard, Atty.
AM. PHOTO-LITHOGRAPHIC Co. N.Y. (OSBORNE'S PROCESS)

UNITED STATES PATENT OFFICE.

JESSE K. PARK, OF MARLBOROUGH, NEW YORK, ASSIGNOR, BY MESNE ASSIGNMENTS, TO THE AMERICAN BASKET COMPANY, OF NEW BRITAIN, CONNECTICUT.

IMPROVEMENT IN FRUIT-BASKETS.

Specification forming part of Letters Patent No. 28,105, dated May 1, 1860; reissue No. 5,579, dated September 23, 1873; application filed August 29, 1873.

*To all whom it may concern:*

Be it known that JESSE K. PARK, of Marlborough, in the county of Ulster and State of New York, invented certain new and useful Improvements in Fruit-Baskets, of which the following is a specification:

The nature of said invention consists in forming the bottom and uprights of the basket of flat plates or laminæ, of wood or suitable material, that are divided or formed into strips at the end portion, while the center parts are left solid, the slit ends being bent up, whereby said laminæ form the solid bottom and open uprights or sides of the basket, as hereinafter described.

By the employment of a circular band connected to the ends of the laminæ above described the basket will assume an angular box shape at the bottom and a round basket shape at the top.

In the accompanying drawing, Figure 1 is a side elevation of a basket which embodies the said invention; and Fig. 2 is a plan view of the splints which form the bottom and uprights in said basket.

This improved basket is intended for transporting berries of all kinds to market, and it preserves the berries in fine order, because the bottom on which the weight of the berries rests is smooth, hence not liable to puncture and injure the berries while the slits in the ends of the laminæ provide ample ventilation.

*a a* designate thin laminæ, of elm or other suitable material, slit toward their ends so as to divide the ends into several splints while the middle portion of each lamina is left solid or uncut. These pieces or laminæ *a a* are laid across each other, as shown in Fig. 2, and attached together. The ends are then turned up at nearly right angles to the bottom to form the uprights or sides, and filling *b* is interlaced between such splints. The slit ends of the laminæ *a a* are secured in place by a circular band, which is formed of two bands or rims, *c d*, placed, respectively, upon the outside and inside at the ends of the splints, and secured by tacks so as to unite the rims to each other and to the splints. The inner rim or flat band should be of wood so as not to cut or injure the berries, and in order to give additional strength the outer rim may be of metal. The slits in the ends of the laminæ allow free ventilation at the sides while the bottom is smooth and solid, and they also allow the splints to be spread at the ends of each lamina, so that they may conform to the circular band at the top while the bottom remains angular or square.

What is claimed as the invention of said PARK is—

1. In a fruit or berry basket, the laminæ of wood, *a a*, slit toward their ends and laid across each other, the slit ends being bent up, substantially as described, whereby said laminæ of wood form the solid bottom and open uprights of the basket, as set forth.

2. A fruit or berry basket in which the bottom and uprights are formed of laminæ of wood, slit toward their ends and laid across each other, and connected to a circular band at their ends, so as to assume an angular box-shape at the bottom and a round basket-shape at the top, all substantially as described.

In testimony whereof I, the president of the American Basket Company, of New Britain, Connecticut, have hereto set my hand this 23d day of August, A. D. 1873.

O. A. NORTH.

Witnesses:

L. G. ROSSETTER,

THERON H. CAMP.